W. H. PARHAM.
VEHICLE TIRE FASTENER.
APPLICATION FILED JULY 27, 1920.
1,395,206.
Patented Oct. 25, 1921.
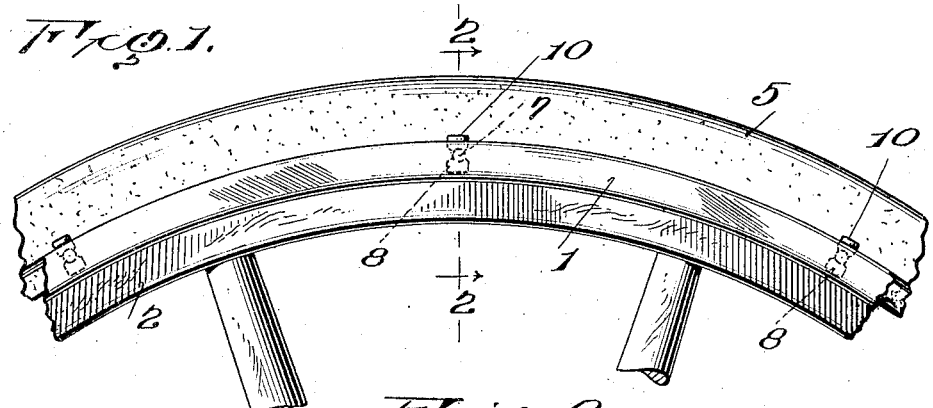
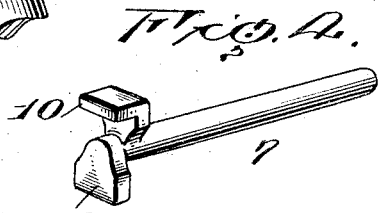
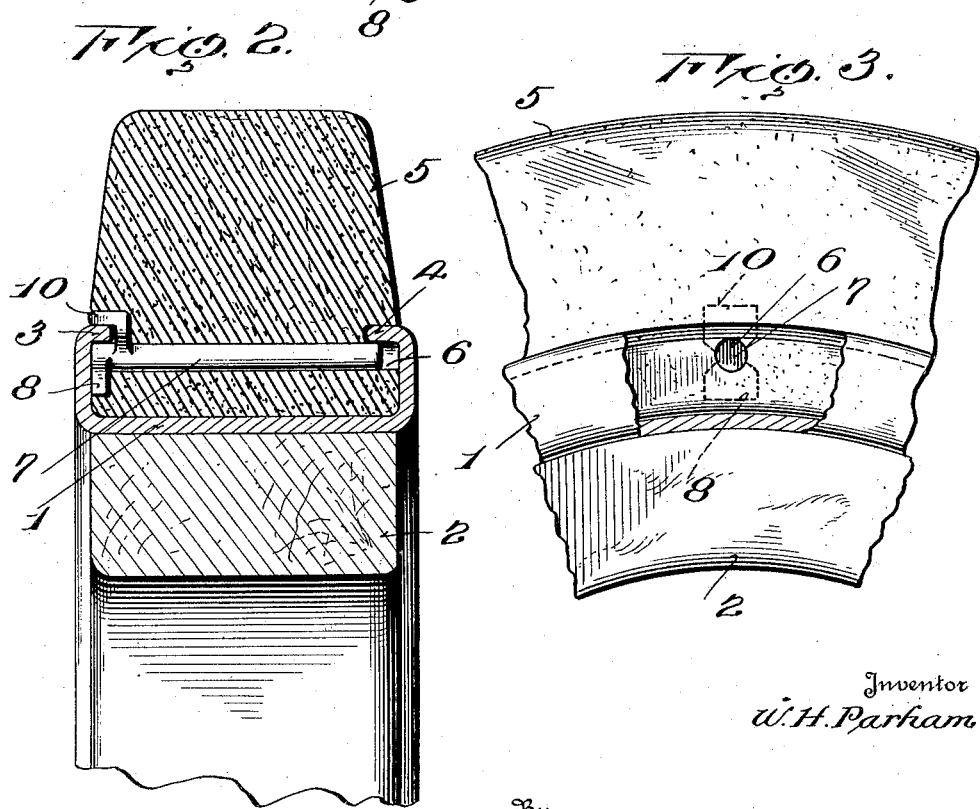
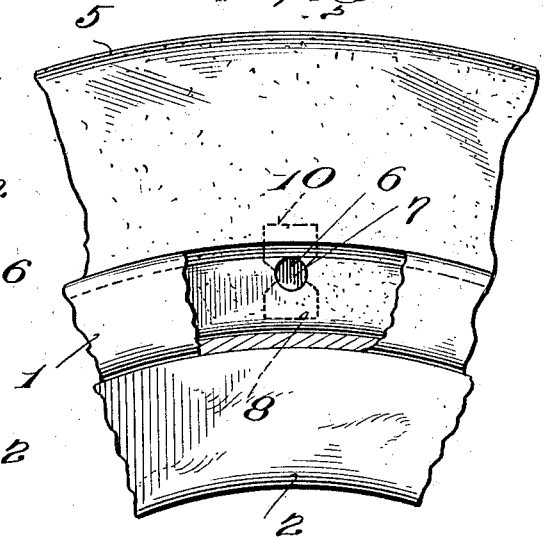
Inventor
W. H. Parham
By
Attorney

UNITED STATES PATENT OFFICE.

WILLIAM H. PARHAM, OF KNOXVILLE, TENNESSEE, ASSIGNOR TO PARHAM AUTO PATENTS CORPORATION, OF KNOXVILLE, TENNESSEE, A CORPORATION OF DELAWARE.

VEHICLE-TIRE FASTENER.

1,395,206.   Specification of Letters Patent.   Patented Oct. 25, 1921.

Application filed July 27, 1920. Serial No. 399,380.

*To all whom it may concern:*

Be it known that I, WILLIAM H. PARHAM, a citizen of the United States, residing at Knoxville, in the county of Knox and State of Tennessee, have invented certain new and useful Improvements in Vehicle-Tire Fasteners, of which the following is a specification, reference being had therein to the accompanying drawings.

This invention relates to certain new and useful improvements in a vehicle tire fastener and is an improvement on a construction of tire fastener disclosed in my applications Serial Nos. 383,121 and 383,122, filed May 21st, 1920, the object being to provide a tire fastener formed of a single member so constructed and mounted within the base of the resilient tire that it will securely hold the tire in position within the rim.

Another object of my invention is to provide a tire fastener which is adapted to be used in connection with a channel rim having annular grooves in its side walls formed by turning the outer edges of the vertical flanges of the channel inwardly, one flange being turned inwardly more than the other to produce a groove of a greater width to receive the end of the fastening member when placed under pressure.

Other and further objects and advantages of the invention will be hereinafter set forth and the novel features thereof defined by the appended claims.

In the drawings,

Figure 1 is a detail view of a portion of a wheel constructed in accordance with my invention showing the application of the tire fastener.

Fig. 2 is an enlarged section taken on line 2—2 of Fig. 1.

Fig. 3 is a side elevation of a portion of a wheel and tire, the rim being broken away to show the fastener in position; and Fig. 4 is a perspective view of the tire fastener detached.

In carrying out my invention I employ a channel rim 1 mounted on a felly 2, the side walls of the channel rim being provided with grooves formed by turning the outer edges of the vertical flanges inwardly as shown at 3 and 4, the turned in portion 4 being of a greater width than the turned in portion 3 in order to produce a groove of a greater depth as clearly shown in Fig. 2 for the purpose hereinafter fully described.

I am aware that the rim may be formed in various ways and I do not wish to limit myself to the particular manner of forming the rim so long as the channel rim is provided with annular grooves on its sides of different depth.

Mounted within the rim is a resilient tire 5 which is provided with spaced transverse openings 6 which may be arranged at any desired distance apart according to the size of the tire to be fastened and I do not wish to limit myself to the number of fastening devices employed as the same can be increased or decreased to meet the requirements. Mounted within the transverse bores 6 formed in the base of the resilient tire 5 are fastening members composed of metal rods 7 having at one of their ends depending enlarged members 8 which are adapted to fit against the inner wall of the groove of the channel rim as shown in Fig. 2 so that when the rod is moved, the base of the tire beneath the rod will be compressed and while I have shown these members 8 of a particular shape, it will of course be understood that they can be formed of any shape desired as it is only necessary to provide the rods with enlargements so that the base of the tire will be compressed when pressure is applied to the rod. The end of the rod, when the fastening device is in the position shown, extends under the overhanging portion 3 of the rim and the opposite end under the overhanging portion 4 of the rim. Extending outwardly from the rod 7 of each of the fastening devices is an angular lug 10 which is adapted to extend over the overhanging portion 3 of the channel rim into such a position that a suitable instrument can be placed on the rim with one of its members against the angular lug 10 so that pressure can be readily applied to the fastening member which will cause the rod to slide within the transverse bore 6 so that the end under the overhanging portion 3 will be moved into such a position that the tire can be readily removed. The depending enlargement 8 forms means whereby the rod is held in the position as shown in Fig. 2 under pressure of the resiliency of the tires at all times when in position within the rim and by forming the overhanging portions 3 and 4 of different width, a clearance is provided for allowing the fastening member to slide within the bore 6 of the tire so that the opposite end can be moved out from under the overhanging portion 3.

In placing a tire with a fastening device constructed in accordance with my invention on the rim as herein shown, the tire is placed in the rim and pressure applied to the fastening devices at the same time and downward pressure is applied to the tire which allows the tire to be forced within the rim and when the pressure is released on the fastening devices, the resiliency of the tire forces the same into the position shown in Fig. 2 with the fastening members under the overhanging portions of the rim so as to securely fasten the tire in position. When it is desired to remove the tire, it is only necessary to apply pressure to the lugs 10 of the fastening devices by an instrument and to draw outwardly on the tire.

From the foregoing description it will be seen that I have provided a vehicle tire fastener composed of a cross bar or rod slidably mounted within the bore formed in the base of the resilient tire and so constructed that it is free to slide in the bore so that it can be moved into such a position that the tire can be inserted within the rim or removed therefrom and after being placed within the rim it is moved into locked position by the resiliency of the tire.

What I claim is:—

1. In a tire fastener, the combination with a channel rim provided with annular grooves, of a resilient tire arranged within said channel rim provided with a plurality of transversely arranged bores, cross bars slidably mounted within said bores, said cross bars each being provided at one end with an enlargement extending outwardly beyond the edge of the channel rim.

2. In a tire fastener, the combination with a channel rim provided with annular grooves of different depth, of a resilient tire mounted within said rim having a plurality of transversely arranged bores in its base and bars slidably mounted within said bores, said bars provided at one of their ends with enlargements and lugs extending outwardly.

3. In a tire fastener, the combination with a channel rim having overhanging portions to produce annular grooves in the vertical legs thereof, of a resilient tire arranged within said channel rim having a series of transversely arranged bores in its base, and a fastening device mounted within each of said bores and capable of moving therein, said fastening device each comprising a bar provided at one of its ends with an enlargement and a lug extending outwardly.

4. In a tire fastener, the combination with a channel rim having annular grooves, of a resilient tire mounted within said channel rim having transversely arranged bores, fastening devices slidably mounted within said bores and normally held in the grooves of said rim by the resiliency of said tire, each of said fastening devices being provided at one end with with a lug extending outwardly into a plane beyond the edge of said rim.

5. In a tire fastener, the combination with a channel rim provided with annular grooves, of a resilient tire mounted in said rim, and transversely arranged fastening devices slidably mounted in the base of the tire, said fastening devices being provided at one of their ends with enlargements and lugs extending outwardly, said fastening devices being capable of being moved in position to allow the tire to be removed from the rim, said fastening devices being normally held in position to fasten the tire in the channel rim by the resiliency of the tire.

In testimony whereof I have hereunto affixed my signature in the presence of two witnesses.

WILLIAM H. PARHAM.

Witnesses:
WM. A. JOHNSTON,
JOSEPH D. TRUAN.